Patented Apr. 11, 1950

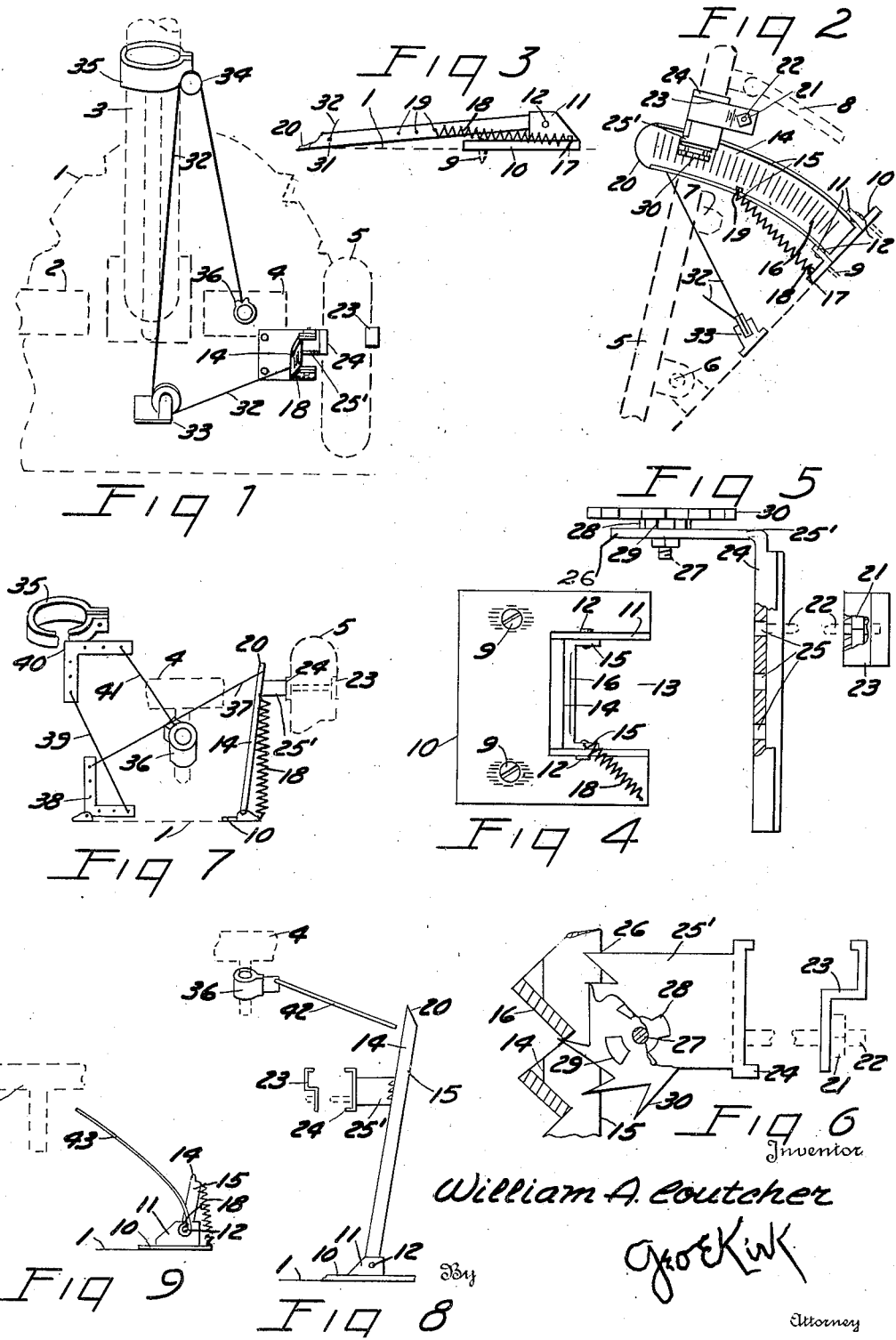

2,503,802

UNITED STATES PATENT OFFICE 2,503,802

VEHICLE CONTROL ACCESSORY

William A. Coutcher, Monroe, Mich.

Application August 26, 1947, Serial No. 770,699

2 Claims. (Cl. 192—1)

This invention relates to motor vehicle driving control. More particularly, the invention has value as an accessory with a wide range for direct adaptation to different internal combustion motor propelled vehicles, even with inter-connection for insuring normal functioning of other controls.

This invention has utility when incorporated in adjustably mountable and selectively locatable set or position catching and holding means automatically operable, say at an accelerator pedal of an automobile, whereby the desired fuel supply or mixture for a maintained motor performance, once set by depression of the pedal, may be held. Furthermore, in the event of occasion for use of another and conflicting control, as a brake, interconnection is worked out herein automatically. Say, if there arise an emergency requiring immediate throwing of the pedal to operate the brakes, at once the operator of the vehicle starts depressing the brake pedal, the unit hereunder as holding the accelerator pedal, releases the accelerator pedal. There is thus a forthright cutting off of special fuel supply to the motor. It is then left up to the driver whether or not the clutch is to be left in for the motor drag to cooperate in vehicle speed reduction or holding from skidding.

Referring to the drawings:

Fig. 1 is a view from the driver's seat looking toward a floorboard installation of a unit hereunder, the motor vehicle parts being shown in dotted lines;

Fig. 2 is a side view of the accelerator holding catch in operative or holding position, the pedal being shown in dotted lines;

Fig. 3 is a view of the catch at thrown out or release position;

Fig. 4 is a detail in plan of the catch mounting base;

Fig. 5 is a fragmentary view of the accelerator pedal toothed attachment features for the catch;

Fig. 6 is a detail, with parts broken away of the toothed means from the upper side of Fig. 5, wherein there is a side elevation of the offset to show the teeth, which are not so exposed in the on-edge view of Fig. 5;

Fig. 7 shows a different transmission in the brake pedal interconnection, than in Fig. 1;

Fig. 8 is a thrust, instead of pull brake pedal interconnector; and

Fig. 9 is a torsion spring actuable from the brake pedal to kick out the accelerator ratchet clear of the accelerator pedal.

At a forwardly and upwardly inclined floorboard 1 in an automobile, there may be located a clutch pedal 2, a steering column 3, a brake pedal 4 and an accelerator pedal 5. In the usual practice of driving, the operator is required to hold a foot upon the accelerator pedal with a degree of depression therefor to vary as speed or load requirements are to be met. Alternatively, there may be another control. The accelerator pedal 5 (Figs. 1, 2) has a pivotal mounting 6 near the heel portion thereof. Near the forward or upper end on the underside of the pedal 5 is a resilient bumper or stop 7 to limit the extent of downward thrust of the toe portion of the pedal 5. There is at the underside of the toe portion of the pedal 5, a transmission connection 8, say to the carburetor of an internal combustion engine, thereby to vary the fuel mixture and determine speed control for the motor propelling the vehicle. During long trips or continued driving, there is advantage in accelerator pedal use, for the foot, say the right foot normal for so regulating the car, is the foot for contrary use at the brake pedal 4. The practice is a safeguarding one, for, in order to apply the brakes, the accelerator pedal is released. Under the invention herein, there is a position holder for the accelerator pedal 5 at its full range of pedal thrusting. This is effected by a simple compact catch device so constructed as to be readily adaptable to a wide range of types of internal combustion engine propelled vehicles. Furthermore, with the right foot at rest or idle notwithstanding the accelerator pedal 5 may be functioning, the driver may react as normally in the use of brakes for the vehicle. This is achieved thru inter-connection responsive at initial thrusting of the brake pedal 4, to release the set adjustment which has been holding the accelerator pedal 5 in the elected depressed position. Accordingly upon this release, the pedal 5 toe portion at once swings upward, cutting out the accelerator control, and there is thus not disturbance from this source for brake performance. The disclosure herein is an improvement over applicant's Patent No. 2,312,031, Feb. 23, 1943.

Screws 9 (Fig. 4) may anchor a bracket plate 10 with the motor vehicle footboard 1 in an appropriate cooperation position as to the accelerator pedal 5. The sheet metal plate 10 has struck up therefrom a pair of parallel ears 11 for aligned pivot rivets 12 with a clearance 13 therebetween. An arc shaped element 14 of thin gage sheet metal has side flanges 15 to form a channel. The lower end of the channel 14, 15, is pivotally mounted by the rivets 12 to swing in the clearance 13. Along the web of the channel 14, 15, is a series of cuts from which there are struck out ribs or teeth 16 of a catch or ratchet. Adjacent a corner 17 of the plate 10 a tension helical spring 18 may be attached to extend to a selected opening 19 along a flange 15 remote from the pivotal mounting 12 for the channel 14, 15. At upright position for the channel 14, 15, as to the plate 10, the spring 18 provides yieldable holding means tending to swing the channel away from the screws 9. However, as the channel be moved as to its top portion over the screws 9 to an extent that the rivets 12 are above the line of direction of the spring 18 between the points 17, 19, the channel 14, 15, at its free end 20 is snapped down toward and held against the floorboard 1. In upright position, the channel 14, 15, as anchored by the screws 9, desirably has slight lateral clearance to one side of and toward the toe portion of the pedal 5, in kick-off proximity thereto.

For the ratchet teeth 16 of the channel 14, 15, cooperating pawl means are provided on the pedal 5 as an adjustable clamp mounting. A nut 21 on a bolt 22 (Fig. 5) is at a clamp element 23 adapted to engage one side of the pedal 5. Complementary clamp element 24 has different holes 25 therethru to provide a range for placing the element 24 alongside the pedal 5. From an end of the element 24 there is an outward offset 25' with notches or teeth 26 having upwardly slanting lower sides. In the practice, the clamp 23, 24, is positioned on the pedal 5 for the teeth 26 to ride over the teeth 16 between the reinforcing and guide flanges 15.

Provision is made to prolong the useful life of this accessory. Thru the offset 25' is a bolt 27 (Figs. 5, 6). Surrounding the opening thru the offset 25' for the bolt 27 there is struck out radiating lug portions 28 complementary to lug portions 29 on a toothed wheel or disk 30 held by the bolt 27 against the offset 25'. As so mounted the teeth of the disk 30 are actively outward beyond the teeth 26 of the offset 25'. However, these teeth of the disk 30 operate as do the teeth 26 in holding the pedal 5 depressed as the teeth 16 are engaged. As a tooth on the disk 30 wears off or lacks effectiveness, the disk 30 may be turned sufficiently to expose another tooth. The clutch faces 28, 29, may permit this angular shifting of the disk without slackening the bolt 27, or the bolt 27 may be kept sufficiently tight to require slight release and resetting upon such resetting of the disk 30. In either event, the clutch holding for the disk 30 should be ample to hold the pedal 5. When the wheel or disk 30 be worn out, it may be discarded and the teeth 26 used, or a substitute disk 30 supplied.

Near the end 20 of the catch channel 14, 15, is a connection 31 to a flexible line 32, extending downward about a pulley 33 fixed with the floorboard 1 adjacent the steering column 3. Therefrom, the line 32 has an upward reach to pass about a pulley or guide 34 mounted by an adjustable clamp 35 on the column 3. From the pulley 34, the line 32 extends downwardly to an adjustable clamp 36 at the stem carrying the brake pedal 4. This is an inter-connection automatic control such that, while the spring 18 holds the teeth 16, 26 or 30 in mesh, at once the brake pedal 4 be started down, the line 32 not only pulls the catch channel 14, 15, away from the pedal 5 clear of the teeth 26 or 30, for the pedal 5 to recover, but this disconnection may be sufficient to swing the channel to a full inoperative position (Fig. 3). In this latter event, the driver should swing the end 20 upward past the dead center position, when the accelerator pedal accessory is desired to be again used.

A purpose hereunder as to the inter-connection is for the accelerator pedal to be released from its setting at once there be a conflicting control initiated. With hydraulic brake systems, a line connection may build up pressure for directly thrusting at or pulling upon the catch channel 14, 15, say with transmission connection thereto adjacent the end 20. There may be variants in the transmission as may be desirable for ample range of footway clearance and to be readily adaptable to the arrangement of the collateral controls. An embodiment (Fig. 7) has from the end 20 of the channel 14, 15, a pull line 37 to an adjustable angle lever 38 rockably mounted on the footboard 1. From the lever 38 there is a pull line 39 to a second adjustable angle lever 40 pivotally mounted at the clamp 35 on the steering column 3. A third section 41 of this pull transmission is shown connected to a brake operating member at the clamp 36. As with the showing in Fig. 1, depression of the brake pedal 4 (Fig. 7), pulls the accelerator pedal holding channel 14, 15, clear for the pedal 5 with resulting automatic cutting out of accelerator holding in for the motor.

In lieu of pull transmission (Figs. 1, 7), there may be a push or thrust transmission, whether from pressure build up to operate a piston, or from the clamp 36 at the brake pedal 4 (Fig. 8) having a rod 42 directed therefrom, so that at starting of the depressing of the brake pedal 4, the rod 42 is sufficiently against the free end of the channel 14, 15, to move its teeth 16 clear of the teeth 26 of the offset 25'. As with the showings in Figs. 1, 7, this shifting of the catch channel 14, 15, frees the accelerator pedal 5 for its automatic recovery, and in advance of the application of the brakes to the motor vehicle.

The inter-related accessory installation herein provides a restful control for continued driving, with safety assurance that notwithstanding the positive holding for the accelerator, it is automatically thrown out as occasion for other contrary control is brot into use.

A still more simple-throw-out for the accelerator pedal holding catch or ratchet 15 is by a torsion spring 43 (Fig. 9) having a mounting wrap about the pivot rivet 12 mounting the ratchet in the ears 11. The short arm of this spring 43 rises from the rivet 12 and extends back of the ratchet 15, with the longer arm as a free end below the brake pedal 4. As the pedal 4 is depressed, the long arm of the spring 43 is moved downward, causing the short arm to rock the catch clear of the holding teeth at the accelerator pedal 5. This means that at once the brake pedal 4 is depressed, the accelerator pedal 5 is freed to recover. As the brake pedal is released, the spring 43 returns to normal position, and the catch is urged toward the holding teeth for engagement as the accelerator pedal 5 be again depressed.

What is claimed and it is desired to secure by Letters Patent is:

1. An accelerator pedal control for a pedal having a pivotal mounting with the pedal rising from a footboard, said control comprising a rockably mounted toothed arc member anchored on the footboard, spring means for swinging the member into proximity with the direction of pedal movement, a clamp engaging the pedal, and multiple toothed means carried by and adjustably movable relatively to the clamp for co-acting with the member to position the pedal.

2. A motor control accessory adaptable to an accelerator pedal and a brake pedal adjacent thereto in such proximity as to be normally controlled by the same foot of the vehicle operator, said accessory comprising a plate attachable to the footboard at the region of the accelerator pedal, a toothed arc member rockably mounted on the plate, a spring extending between the plate and member and functioning at upright position of the member to swing the member toward the pedal, complementary plural toothed catch means, a clamp to mount the catch means on the pedal and as to which pedal a selected catch means tooth may be positioned to coact with the arc member to lock the pedal depressed, and throw-out means coacting between the brake pedal and member operable at initiation of brake pedal depression to clear the member from the catch means in thereby freeing the accelerator pedal from the control.

WILLIAM A. COUTCHER.

REFERENCES CITED

The following references are of record in the file of this patent:

UNITED STATES PATENTS

| Number | Name | Date |
|---|---|---|
| 1,329,142 | Ritter | Jan. 27, 1920 |
| 1,436,154 | Dickerson | Nov. 21, 1922 |
| 1,569,612 | Burrows | Jan. 12, 1926 |
| 1,662,211 | Shier | Mar. 13, 1928 |
| 1,830,441 | Mulhollen | Nov. 3, 1931 |
| 1,855,538 | Abel | Apr. 26, 1932 |
| 2,033,821 | Ellery | Mar. 10, 1936 |
| 2,076,460 | Heinrich | Apr. 6, 1937 |
| 2,093,938 | Stahl | Sept. 21, 1937 |
| 2,312,031 | Coutcher | Feb. 23, 1943 |